United States Patent Office 3,701,646
Patented Oct. 31, 1972

3,701,646
COMBATING WEEDS WITH LOWER ALKYL 3-PHENYLCARBAMOYLOXYTHIOLCARBANILATES
Ralph P. Neighbors, Olathe, Kans., assignor to Gulf Research & Development Company, Pittsburgh, Pa.
No Drawing. Filed Aug. 13, 1969, Ser. No. 849,857
Int. Cl. A01n 9/12
U.S. Cl. 71—100                1 Claim

ABSTRACT OF THE DISCLOSURE

Weeds are combated in both soybeans and small grains by post-emergent application of lower alkyl 3-phenylcarbamoyloxythiolcarbanilates, for example, S-ethyl 3-(N'-m-tolylcarbamoyloxy)thiolcarbanilate.

DESCRIPTION OF INVENTION

It has recently been discovered that certain alkyl 3-phenylcarbamoyloxycarbanilates have the rather rare property of relatively high phytotoxicity toward a number of plant species but relatively low toxicity toward sugar beets. I have now discovered that certain lower alkyl 3-phenylcarbamoyloxythiolcarbanilates have high phytotoxicity toward sugar beets and many weeds, but relatively low toxicity toward soybeans, which is also unusual, there being very little selection of weed control agents available for either sugar beets or soybeans.

Briefly, the novel class of herbicides of this invention may be represented by the structural formula

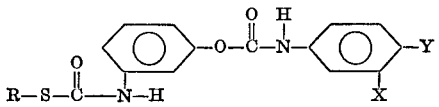

in which R is a lower alkyl group having from one to four carbon atoms and X and Y are selected from the group consisting of hydrogen, chloro, methyl, ethyl, propyl, isopropyl, butyl and tert.-butyl. These compounds may be synthesized and formulated into agricultural spray mixtures by conventional methods. Post-emergent application is preferred, the compounds being effective at application rates of from about 1 lb. per acre to 5 lb. per acre where plants are not protected from the spray. In heavy infestations where some weeds are sheltered by others, either a higher rate of application or a repeated application may be necessary, as will be understood by those skilled in the art.

SYNTHESIS OF THE HERBICIDES

The herbicides of this invention are conveniently made by reaction of an N-(3-hydroxyphenyl)thiolcarbamate with a phenyl isocyanate. These intermediates are readily made by known methods. The thiolcarbamate intermediate may be made by reaction of an alkyl chlorothiolformate with m-aminophenol, by a method of the type exemplified by the procedure of Riemschneider and Lorenz: Monatsch. Chem., vol. 84, p. 518 (1953). The phenyl isocyanate is made by reaction of the corresponding aniline with phosgene by any of the well known commercial methods. Lower alkyl chlorothiolformates, m-aminophenol and the phenyl isocyanates are all articles of commerce. The procedure for manufacture of one of the novel herbicides is presented below by way of illustration.

PREPARATION OF ETHYL 3-(3,4-DICHLOROPHENYL) CARBAMOLYOXYTHIOCARBANILATE

Ethyl N-(3-hydroxyphenyl)thiolcarbamate (7.9 g., 0.04 mole), benzene (100 ml.) and a trace of catalyst (triethylenediamine) was treated dropwise with a solution of 3,4-dichlorophenyl isocyanate (7.5 g., 0.04 mole) in benzene (50 ml.). The mixture was heated to reflux temperature, the heat source removed, and stirring continued for two hours. The product was removed by filtration, washed with hexane (50 ml.) and dried. There was obtained 13.6 g. (M.P. 146–148° C.; 88%) of ethyl N-[3-(3',4' - dichlorophenyl)carbamoyloxy]thiolcarbamate.

*Analysis.*—Calculated for CHClNOS (percent): C, 49.89; H, 3.66; N, 7.27. Found (percent): C, 49.92; H, 3.71; N, 7.02.

Below are listed herbicidal compounds made by the procedure illustrated above:

| Compound | | | Analysis (calcd./found) | | |
|---|---|---|---|---|---|
| No. | Name | M.P. (° C.) | Carbon | Hydrogen | Nitrogen |
| 1 | Ethyl 3-(3',4'-dichlorophenylcarbamoyloxy)thiolcarbanilate. | 146–148 | 49.89/49.92 | 3.66/3.71 | 7.27/7.02 |
| 2 | Ethyl 3-(phenylcarbamoyloxy) thiolcarbanilate. | 138–140 | 60.74/60.47 | 5.10/4.83 | 8.85/8.80 |
| 3 | Ethyl 3-(3'-chlorophenylcarbamoyloxy) thiolcarbanilate. | 156–158 | 54.78/54.70 | 4.31/4.20 | 7.98/7.96 |
| 4 | Ethyl 3-(m-tolylcarbamoyloxy)thiolcarbanilate. | 151–153 | 61.80/61.71 | 5.49/5.45 | 8.47/8.08 |

USE OF THE HERBICIDE

So as to illustrate clearly the selective phytotoxic properties of the herbicides, a group of controlled greenhouse experiments is described below.

(1) Post-emergent use

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots of each species were sprayed with an aqueous dispersion of the active compound prepared as described above, at a rate of 5 lb. of active compound per acre and at a spray volume of 60 gallons per acre. Approximately one week after the spray application the plants were observed and the results rated according to the following schedule:

Type of action:                          Degree
  C=chlorosis (bleaching) _____ 0=no effect.
  N=necrosis _____ 1=slight effect.
  G=growth inhibition _____ 2=moderate effect.
  F=formative effect (abnormal
    form of growth) _____ 3=severe effect.
  K=non-emergence _____ 4=maximum effect
                                                      (all plants died).

The same rating schedule was employed to judge pre-emergent results obtained according to the procedure below.

(2) Pre-emergent use

A solution of each active compound was prepared by dissolving 290 mg. of the compound to be tested in 200 ml. of acetone. Disposable paper trays about 2½ inches deep of molded pulp were prepared and seeded with a variety of species of plant seeds, then sprayed with the acetone solution at the rate of 10 lb. of active chemical per acre of sprayed area. One tray, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the plants were examined and herbicidal effect was rated according to the above schedule.

Both post-emergent and pre-emergent results are set forth in the following table.

I claim:
1. Combating weeds in the presence of a growing crop of soybeans by applying post-emergently to the locus of the weeds an effective amount of a 3-phenylcarbamoyl-oxythiolcarbanilate of the structural formula

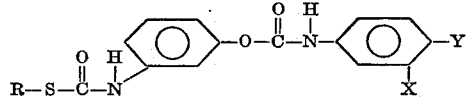

RESULTS OF POST- AND PRE-EMERGENT USE AS HERBICIDES

| Compound No. | Use | Crab-grass | Cox-comb | Brome | Mil-let | Soy-bean | Cot-ton | Alfalfa | Oats | Corn | Flax | Radish | Sugar beet | Wheat | Grain sor-ghum | Tomato |
|---|---|---|---|---|---|---|---|---|---|---|---|---|---|---|---|---|
| 1 | Post | | | | | N1 | N2 | | N1 | | N3 | N3 | | N2 | | N2 |
|   |      | | | | N4 | G1 | G1 | N4 | G1 | N1 | G3 | G3 | N4 | G2 | 0 | C1 |
|   | Pre  | 0 | 0 | 0 | 0 | 0 | 0 | 0 | 0 | 0 | 0 | 0 | 0 | | | |
| 2 | Post | | | | | N1 | | | N3 | N1 | | | | N3 | | |
|   |      | | | | N4 | G1 | N4 | N4 | G2 | G1 | N4 | N4 | N4 | G2 | G1 | N4 |
|   | Pre  | 0 | 0 | 0 | 0 | 0 | 0 | 0 | 0 | 0 | 0 | 0 | 0 | | | |

RESULTS OF POST- AND PRE-EMERGENT USE AS HERBICIDES—Continued

| Compound No. | Use | Crab-grass | Cox-comb | Brome | Mil-let | Soy-bean | Cot-ton | Alfalfa | Oats | Corn | Flax | Radish | Sugar beet | Wheat | Grain sor-ghum | Tomato |
|---|---|---|---|---|---|---|---|---|---|---|---|---|---|---|---|---|
| 3 | Post | | | | | N3 | | N2 | N1 | | | | | N1 | | N3 |
|   |      | | | | N4 | N1 | N4 | G3 | G2 | G1 | N4 | N4 | N4 | G1 | 0 | G3 |
|   | Pre  | 0 | 0 | 0 | 0 | 0 | 0 | 0 | 0 | 0 | 0 | 0 | 0 | | | |
| 4 | Post | | | | | N1 | | | N3 | N2 | | | | N3 | | |
|   |      | | | | N4 | G1 | N4 | N4 | G3 | G1 | N4 | N4 | N4 | G2 | G1 | N4 |
|   | Pre  | 0 | G1 | 0 | 0 | 0 | 0 | 0 | 0 | 0 | 0 | 0 | 0 | | | |

It will be observed from the results tabulated above that pre-emergent phytotoxicity of these compounds is practically negligible. A second series of tests of post-emergent activity at much lower rates of application was conducted according to the above procedure and results were rated in the same manner. These results are tabulated below.

in which R is a lower alkyl group having from one to four carbon atoms and X and Y are selected from the group consisting of hydrogen, chloro, methyl, ethyl, propyl, isopropyl, butyl and tert.-butyl.

| Compound Number | Rate, lb./a. | Millet | Soy-beans | Cotton | Alfalfa | Oats | Corn | Flax | Radish | Sugar beets | Wheat | Grain sorghum | Tomato |
|---|---|---|---|---|---|---|---|---|---|---|---|---|---|
| 1 | 2 | N3G3 | N1 | N2G1 | N3G3 | 0 | 0 | N2G1 | N3G3 | N3G3 | N2G2 | 0 | N2C2 |
|   | 1 | N3G3 | N1 | 0 | N1 | 0 | 0 | N1G1 | N2G2 | N3G3 | N1G1 | 0 | C2 |
| 2 | 2 | N4 | N1 | N4 | N4 | N2G1 | N1G1 | N4 | N3G3 | N4 | N2G2 | G1 | N4 |
|   | 1 | N3G3 | N1 | N4 | N4 | N1 | N1 | N3G3 | N2G1 | N4 | N1G1 | 0 | N4 |
| 3 | 2 | N3G3 | N1 | N4 | N3G3 | N1 | N1G1 | N4 | N3G3 | N4 | N1G1 | 0 | C3N3G3 |
|   | 1 | N3G2 | 0 | N2G2 | N3G3 | N1 | N1 | N4 | N2G1 | N4 | N1G1 | 0 | C2N2G2 |
| 4 | 2 | N4 | N1 | N4 | N4 | N2G1 | N1G1 | N4 | N4 | N4 | N3G2 | 0 | N4 |
|   | 1 | N4 | N1 | N4 | N4 | N1G1 | 0 | N4 | N3G3 | N4 | N2G2 | 0 | N4 |

References Cited
UNITED STATES PATENTS
3,404,975  10/1968  Wilson et al. _____ 71—100

JAMES O. THOMAS, JR., Primary Examiner

U.S. Cl. X.R.
260—455